(12) United States Patent
Oriakhi et al.

(10) Patent No.: US 8,840,234 B2
(45) Date of Patent: Sep. 23, 2014

(54) INK COMPOSITIONS AND METHODS OF USE

(75) Inventors: Christopher O. Oriakhi, Corvallis, OR (US); Sukanya Rengaswamy, Corvallis, OR (US); Tayo Olu Yolemi, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 13/265,853

(22) PCT Filed: Apr. 23, 2009

(86) PCT No.: PCT/US2009/041562
§ 371 (c)(1),
(2), (4) Date: Oct. 21, 2011

(87) PCT Pub. No.: WO2010/123504
PCT Pub. Date: Oct. 28, 2010

(65) Prior Publication Data
US 2012/0062661 A1 Mar. 15, 2012

(51) Int. Cl.
| | | |
|---|---|---|
| B41J 2/01 | (2006.01) | |
| C09D 7/12 | (2006.01) | |
| B41J 2/21 | (2006.01) | |
| C09D 5/36 | (2006.01) | |
| C09D 11/38 | (2014.01) | |
| C08K 3/22 | (2006.01) | |
| C08K 3/30 | (2006.01) | |

(52) U.S. Cl.
CPC ............... *C09D 7/1275* (2013.01); *B41J 2/01* (2013.01); *B41J 2/2107* (2013.01); *C08K 3/22* (2013.01); *C08K 3/30* (2013.01); *C09D 5/36* (2013.01); *C09D 7/1216* (2013.01); *C09D 7/1266* (2013.01); *C09D 11/38* (2013.01)
USPC ............................. 347/100; 347/95; 106/31.6

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21
USPC ........... 347/100, 95, 96, 88, 99, 102, 103, 20, 347/21, 9; 106/31.6, 31.13, 31.27; 523/160, 523/161
See application file for complete search history.

(56) References Cited

U.S. PATENT DOCUMENTS

| | | | | |
|---|---|---|---|---|
| 5,431,720 A | * | 7/1995 | Nagai et al. ............... | 347/100 |
| 5,547,804 A | | 8/1996 | Nishizawa et al. | |
| 5,674,644 A | | 10/1997 | Nazri | |
| 6,277,183 B1 | * | 8/2001 | Johnson et al. ............ | 106/31.6 |
| 6,332,943 B1 | * | 12/2001 | Herrmann et al. .......... | 156/277 |
| 6,726,759 B2 | | 4/2004 | McElligott et al. | |
| 7,208,252 B2 | | 4/2007 | Grande et al. | |
| 2003/0044737 A1 | * | 3/2003 | Bourdelais et al. ........... | 430/533 |
| 2005/0214693 A1 | * | 9/2005 | Kano et al. .................... | 430/322 |
| 2008/0257204 A1 | | 10/2008 | Oriakhi et al. | |
| 2008/0259147 A1 | | 10/2008 | Oriakhi et al. | |
| 2010/0187805 A1 | * | 7/2010 | Sano et al. ........................ | 347/9 |

FOREIGN PATENT DOCUMENTS

| | | | | | |
|---|---|---|---|---|---|
| EP | 1862511 A1 | * | 12/2007 | ................. | B41J 2/01 |
| JP | 05-134451 A | | 5/1993 | | |
| JP | 06-264013 A | | 9/1994 | | |
| JP | 07-138507 A | | 5/1995 | | |
| JP | 2003049091 A | * | 2/2003 | ............. | C09D 11/00 |
| JP | 2006124547 A | | 5/2006 | | |
| JP | 2008-297486 A | | 12/2008 | | |
| JP | 2008297486 A | | 12/2008 | | |
| KR | 20060070058 A | | 6/2006 | | |
| WO | WO 2004035684 A2 | * | 4/2004 | ............. | C09D 11/00 |

OTHER PUBLICATIONS

Machine Translation of Publication #JP 07-138507 of Application # JP05-311214, Nakajima Shinichiro, Translated and Printed May 1, 2013.*

International Search Report (ISR) and Written Opinion of the International Searching Authority (ISA) mailed Jan. 25, 2010 from ISA/KR for counterpart PCT Application No. PCT/US2009/041562 (12 pages).

Patton, Wayne F. et al., "Rapid, high-yield purification of cell surface membrane 2 using colloidal magnetite coated with polyvinylamine: Sedimentation versus magnetic isolation", Biochimica et Biophysica Acta 816 (1985), pp. 83-92.

Weissleder, Ralph et al., "Pharmaceutical Iron Oxides for MR Imaging", Reviews of Magnetic Resonance in Medicine, vol. 4, pp. 1-20, 1992.

Weissleder, Ralph et al., "Long-circulating iron oxides for MR imaging", Advanced Drug Delivery Reviews 16 (1995) pp. 321-334.

Willard, M. A. et al., "Chemically prepared magnetic nanoparticles", International Materials Reviews, 2004, vol. 49 No. 3-4, pp. 125-170.

Potter, Michael J., "Iron Oxide Pigments", U.S. Geological Survey, 2006 6 Minerals Yearbook, Dec. 2007, pp. 40.1-40.6.

http://en.wikipedia.org/wiki/Ironoxide, 3 pages printed Jan. 26, 2009.

Stark, David D. et al., "Superparamagnetic Iron Oxide: Clinical Application as a Contrast 1 Agent for MR Imaging of the Liver", Radiology, Aug. 1988, pp. 297-301, vol. 168, No. 2.

Supplementary European Search Report (SESR) from the European Patent Office (EPO) for counterpart EP patent application No. EP09843774, 3 pages, dated May 2, 2013.

(Continued)

*Primary Examiner* — Manish S Shah

(57) ABSTRACT

An ink composition includes an aqueous dispersion of particles of a first material and separate particles of a second material. The first material contains an oxide, sulfide, or selenide of a magnetic metal. The ink is formulated to exhibit, after application to a solid substrate, a degree of metallic luster enhanced by the presence of the second material.

14 Claims, No Drawings

(56) References Cited

OTHER PUBLICATIONS

Zaidi, Naveed, et al., Room temperature magnetic order in an organic magnet derived from polyaniline, Polymer 45 (2004) pp. 5683-5689. (Appendix A in Resp/Admt dated Jan. 7, 2014).

Pennicott, Katie, Magnetic Polymer makes its debut, Physicsworld.com, Nov. 16, 2001, 2 pages. (Appendix B in Resp/Amdt dated Jan. 7, 2014).

* cited by examiner

INK COMPOSITIONS AND METHODS OF USE

BACKGROUND

"Luster" refers to an optical property of materials exhibiting a sort of glow from reflected light. "Metallic luster" is generally considered an inherent characteristic of metals, so much so that materials exhibiting this type of gloss or sheen are often merely referred to as looking "metallic." As expanded colors and appearances are sought for home and office decorative printing, inks producing metallic luster are noticeably limited among available options. Gold ink containing pure gold nanoparticles has been reported for printed electronics applications. However, such ink generally is cost prohibitive and ineffective for home and office use. Silver ink containing pure silver nanoparticles (i.e., silver metal ink) carries environmental concerns, requiring "Dangerous to the Environment" labeling at least in European Union countries. Additionally, known silver metal ink has exhibited poor smudge resistance and oxidative fading.

DETAILED DESCRIPTION OF THE EMBODIMENTS

Possibilities for advancement exist in developing cost-effective, environmentally safe inks that yield a metallic luster and/or improving smudge resistance, such as to thumbprints, and fading resistance. In one embodiment, an ink composition includes an aqueous dispersion of particles of a first material and separate particles of a second material. The first material contains an oxide, sulfide, or selenide of a magnetic metal. The ink is formulated to exhibit, after application to a solid substrate, a degree of metallic luster. The metallic luster is enhanced by the presence of the second material.

By way of example, the ink may be formulated to function as an inkjet ink composition. Known inkjet vehicles and/or known techniques for forming inkjet formulations might be used. Even so, it is conceivable that non-inkjet inks formulated in keeping with the embodiments described herein might also exhibit the degree of metallic luster. The vehicle may include one or more of a humectant (e.g., glycerine and/or tetraethylene glycol), a cosolvent to water (e.g., one or more of isopropyl alcohol, 1,5-pentanediol, 2-pyrrolidone, neopentyl alcohol, and 2-methyl-1,3-propanediol), a surfactant (e.g., one or more of TERGITOL 15-S-5, TERGITOL 15-S-7, and SURFYNOL 4653), a biocide (e.g., PROXEL GXL2), and a stabilizer (e.g., 2-aminopropanol). TERGITOL 15-S-5 and 15-S-7 are secondary alcohol ethoxylates available from The Dow Chemical Co. in Midland, Mich. SURFYNOL 465 is an acetylenic diol surfactant available from Air Products and Chemicals, Inc. in Allentown, Pa. PROXEL GXL is a microbistat containing 1,2-benzisothiazolin-3-one and is available from Arch Chemicals, Inc. in Smyrna, Ga.

Notably, the first material particles as well as the second material particles, which are separate from the first material particles, are both dispersed in the aqueous ink composition. Such dispersion may be readily distinguished from known dry toners used in magnetic ink character recognition printing, wherein magnetic materials are polymer coated. The ink composition may contain less than 2.4 weight percent (wt %) of the oxide, sulfide, or selenide, for example, 0.4 to 2.4 wt %, or less than 1 wt %, for example, 0.1 to 1 wt %.

The magnetic metal may include manganese, iron, cobalt, nickel, gadolinium, or a combination thereof, such as their alloys or other forms. Even so, other metals with unpaired electrons might exhibit sufficient magnetic properties for the ink composition. Observation indicates that iron is the most strongly magnetic, with manganese second. Cobalt and nickel are less magnetic and might also exhibit some toxicity in the ink composition. As an additional feature, the applied ink may itself be magnetic, allowing magnetic attraction between the printed substrate and other surfaces.

Also, oxides of the magnetic metal initially appear to possess the greatest ease of use and handling; however, sulfides or selenides of the magnetic metal may be feasible. An expectation exists that stable aqueous dispersions of particles can most easily be made with the oxides. One concern in using sulfides includes the smell and potential hazard from evolution of hydrogen sulfide. The ink composition might be alkalized to a high pH, in a manner known to those of ordinary skill, to avoid hydrogen sulfide evolution at lower pH values.

Consequently, the oxide, sulfide, or selenide of the magnetic metal may include iron oxide. More specifically, the oxide, sulfide, or selenide may include wustite, magnetite, hematite, maghemite, or a combination thereof. As known, wustite represents the iron (II) oxide form, magnetite represents the iron (II, III) oxide form, and hematite and maghemite represent different phases of the iron (III) oxide form. Magnetite and hematite are oxidatively stable in aqueous environment; however, wustite (FeO) is oxidatively unstable and can readily revert to $Fe_2O_3$ or $Fe_3O_4$.

Iron oxide pigments have been used for years in a number of applications due to their chemical and physical properties including excellent hiding strength, thermal resistance, good chemical resistance, hue and tint strength, gloss and flatting, and stability, as well as excellent light and weather fastness. Additionally, iron oxide pigments are environmentally safe. Even so, known applications for iron oxide pigments, such as screen printing, use pigment particle sizes typically greater than 5 micrometers (microns), which is too large for inkjet printing.

Ferrofluids, also known as liquid magnet, are known stable colloidal dispersions of ferromagnetic inorganic oxide nanoparticles, such as magnetite ($Fe_3O_4$), hematite ($Fe_2O_3$), or other compounds containing iron. Several applications exist for ferrofluids. For example, due to its strong magnetic properties, magnetite ferrofluids have been used in biology and medicine for the magnetic separation of biochemical products and cells. Because of its very high magnetic susceptibility, magnetite has also been used as a contrast agent for magnetic resonance imaging. Other applications for ferrofluids include cancer treatment, cooling of loudspeakers, sealant, power and distribution transformers, quiet solenoids, sensors, and switches.

The second material may contain either a conjugated, conductive polymer or a zero-valent metal. The polymer may include polypyrrole, polythiophene, polyaniline, polyfuran, copolymers of at least two of pyrrole, thiophene, aniline, and furan, or a combination thereof. Other examples include polymers such as poly(p-phenylene vinylene), poly(N-phenylimino-1,4-phenylene-1,2-ethenylene-1,4-(2,5-dioctoxy)-phenylene-1,2-ethenylene-1,4-phenylene), poly(benzobisimidazole), poly-9,9'dioctyl-fluorene-co-bithiophene, poly[(4-ethynyl)phenylacetylene] and poly(benzobisimidazobenzo-phenanthroline) or copolymers such as 2'-ethb(poly[2,5-dioctyloxy-1,4-diethynyl-phenylene-alt-2,5-isylhexyloxy)-1,4-phenylene] (EHO-OPPE), and poly[2,5-dioctyloxy-1,4-diethynyl-phenylene-alt-2-methoxy,5-2'-ethylhexyloxy-1,4-phenylene] (MEH-OPPE). The ink composition may contain less than 2 wt % of the polymer, for example, 0.2 to 2 wt %. Alternatively, the second material may include zero-valent Ti, Mn, Mo, Pd, Ag, Sn, Ta, Pt, Au, or a combination thereof. The ink composition may contain 0.5 to 5 wt % of the zero-valent metal.

As stated above, the degree of metallic luster is enhanced by the presence of the second material. This condition holds true for both the conjugated, conductive polymer and the zero-valent metal. Although the degree of metallic luster may generally be readily adjudged by those of ordinary skill, quantitative techniques making use of known reflectivity measurements or ellipsometry may be used.

Further, in one embodiment, the second material may include a conjugated, conductive polymer and the ink may be formulated such that the degree of metallic luster is also enhanced by the presence of the oxide, sulfide, or selenide. In contrast, in another embodiment, the second material may include a zero-valent metal and the degree of metallic luster may be exhibited even in the absence of the oxide, sulfide, or selenide of the magnetic metal. In the one embodiment, metallic luster is provided by both the first material and the second material in combination as a synergistic effect. In the other embodiment, metallic luster is provided by the zero-valent metal without regard to the oxide, sulfide, or selenide. Examples of each embodiment are described below.

The concept of a conjugated, conductive polymer refers to known polymers with alternating double and single bonds along a carbon backbone. The polymer may be functionalized to include various moieties imparting properties desired for the ink composition or otherwise derivatized, provided the polymer retains its conjugated, conductive structure. Desirable groups may include alkyl groups (e.g. $CH_3$, $C_2H_5$, $C_3H_7$, etc.), alkoxyl groups (e.g. $OCH_3$, $OC_2H_5$, $OC_3H_7$, etc.), aryl groups (e.g. $C_6H_5$, $C_6H_4CH_3$, etc.), halogen groups and/or organochalcogen groups containing S, Se, or Te, such as mercapto groups. As known, the principal charge carriers in the polymer may be electrons, in which case the polymer is considered "n-doped", or the principal charge carriers may be holes, in which case the polymer is considered "p-doped." Within the context of the present document, "conductive polymer" includes polymers that are not highly conductive, that is, those that may be considered semiconductive. For example, polypyrrole is normally considered semiconductive, but exhibits suitable electrical properties to provide the optical effects described herein. Conductivity ranging from 0.0001 to 2 Siemens/centimeter (S/cm) is considered adequate.

Since the ink composition includes an aqueous dispersion of the particles, one consideration in determining whether a polymer is suitable includes its ability to form a stable aqueous colloidal dispersion. The functionalization and/or derivatization described above might be used to produce a stably dispersed polymer. The formation of polymers is known to yield molecules exhibiting a range of molecular weights, depending on a variety of usually known factors. For a given solvent, often, the molecules are more likely to be soluble at molecular weights of 500 to 2,500. Solubility may vary depending on the solvent power.

The second material particles containing the conjugated, conductive polymer are insoluble and may be produced using any known technique to yield insoluble particles, regardless of molecular weight. However, generally, a conductive polymer exhibiting a weight average molecular weight of 10,000 to 100,000 will be insoluble, unless it is deliberately functionalized to render it soluble in particular solvents. Such solvents in which such polymers are soluble might not be amenable to inkjet ink formulation. Known processes that involve quenching polymerization before molecules grow too long might be used to produce the desired molecular weight. Molecular weight may influence the subsequent mechanical properties and ability to process the polymer, as well as the electrical properties.

For example, molecular weight may influence the size and uniformity of particles and particle morphology. Although weight average molecular weight may be greater than 100,000, perhaps as high as 3,000,000, observation indicates that desired particle sizes are easier to obtain with lower molecular weight. The second material particles may be nanoparticles. The second material particles may exhibit an average particle size less than 200 nanometers (nm). Further, the second material particles may exhibit an average particle size of from 20 nm to 170 nm. In addition to other effects described herein, the low particle size contributes to stability of the ink composition. When the particles become too large, they may lose their Brownian motion behavior and fall out of dispersion.

Similarly, the first material particles may be nanoparticles. The first material particles may exhibit an average particle size less than 200 nm. Further, the first material particles may exhibit an average particle size of from 20 nm to 150 nm. The first material particles may be produced using any known technique. Known processes that involve precipitation of the oxide, sulfide, or selenide from a solution containing a salt of the magnetic metal might be used to produce the desired particle size. Selection of a stabilizer may be used in a known manner to influence the particle sizes obtained. Particle size and size distribution may also be affected in a known manner by other reagents and reaction conditions, e.g., concentrations, reaction time, temperature, etc.

Without being limited to any particular theory, a belief exists that particle size of the first material, and perhaps the second material, may contribute to the metallic luster by producing quantum confinement in the applied ink. In the well-known phenomenon of quantum confinement, as particle size becomes small enough that it approaches the size of a material's Exciton Bohr Radius, electron energy levels are treated as discrete. In this manner a small and finite separation exists between energy levels with repercussions on the absorptive and emissive behavior of the material.

When the second material is a conductive polymer, an electromagnetic interaction appears to occur between the magnetic metal oxide, sulfide, or selenide and the polymer to display an enhanced degree of metallic luster possibly via quantum confinement. Observation indicates that too little conductive polymer reduces the degree of metallic luster. Metallic luster, as judged by the reflectance from printed media, increases as the weight ratio of conductive polymer loading to oxide, sulfide, or selenide loading increases from 0:1 to 1:1. Above a 1:1 ratio, increases in luster from added polymer diminish.

Notably, some known ink compositions that yield a type of luster, for example, pearlescent inks, do not use nanoparticles to provide the desired luster. They typically rely on particle size ranging from at least 5 microns to 100 microns. Their metallic luster is lost when oxide pigments with particle sizes lower than 1 micron are used. In fact, nanoparticles may degrade the luster of the applied ink. As such, the use of nanoparticles in ink does not necessarily yield a benefit that would naturally follow from the increased modern availability of nanoparticles of various materials.

The ink may be formulated such that the oxide, sulfide, or selenide functions as a primary colorant of the ink. Such condition applies most clearly when metallic luster is provided by both the first material and the second material in combination. Ink compositions containing magnetite as the only colorant and lacking a conductive polymer generally exhibit a bronze to pinkish gold color with some metallic luster. The same ink compositions instead containing polypyrrole as the only colorant and lacking an oxide, sulfide, or selenide generally exhibit a silver or PANTONE aluminum color with some metallic luster.

With the combination of magnetite and polypyrrole as primary co-colorants, the ink composition may exhibit a brilliant metallic luster and provide a range of colors, depending on the weight ratio of conductive polymer loading to oxide, sulfide, or selenide loading. The addition of the polymer thus enhances the degree of luster of the oxide, sulfide, or selenide composition. It could also be said that the addition of the oxide, sulfide, or selenide enhances the degree of luster of the polymer composition. In this sense, the combination may be viewed as synergistic, obtaining a result not achievable with either taken alone.

The combination also provides an expanded color gamut. For the example of magnetite as the oxide, sulfide, or selenide and polypyrrole as the polymer, the observed color of bronze to pinkish gold at a 0:1 ratio (no polymer) becomes a yellow gold with increasing amounts of polymer up to a 1:1 ratio. Above a 1:1 ratio, the observed color transitions to the silver or PANTONE aluminum of the 1:0 ratio (no oxide, sulfide, or selenide). Considering metallic luster, the 1:1 ratio gives a yellow gold with brilliant luster. The more silver colors above a 1:1 ratio are also brilliant, but with lesser increases in the degree of luster for the increasing ratio of polymer up to a point where luster decreases to the less lustrous 1:0 ratio. Various organic dyes and/or pigments (such as cyan, magenta, and yellow) may be included as secondary colorants to provide a gamut of colors with a range based on the silver or gold metallic luster. As a result, blue, yellow, green, red, etc. hues of silver and gold can be generated.

In the processes that involve precipitation of the oxide, sulfide, or selenide to form particles, precipitation may occur in the presence of a dye as a dispersant. An alternate approach includes adding dye to an ink vehicle and thereafter adding a dispersion containing the oxide, sulfide, or selenide to the vehicle. Both approaches give similar results except that the first approach of using the dye as a dispersant was observed to yield a more vibrant color and more stable dispersion.

As may be appreciated from the discussion above, in another embodiment, an inkjet ink composition includes an aqueous dispersion of particles of a first material and separate particles of a second material. The first material contains an oxide, sulfide, or selenide of Mn, Fe, Co, Ni, Gd, or a combination thereof. The second material contains a conjugated, conductive polymer. The particles of the first material exhibit an average particle size less than 200 nm and the ink is formulated to function as an inkjet ink composition. By way of example, such an ink composition may be formulated to exhibit, after application to a solid substrate, a degree of metallic luster enhanced by the presence of the second material. Also, for oxides and/or sulfides of Mn and/or Fe, the ink composition may be environmentally safe.

In a zero-valent metal ink, the primary colorant may be the metal, as in the case of silver and/or gold nanoparticles, which provides the metallic luster. Various organic dyes and/or pigments may be included as secondary colorants as described above to provide a gamut of colors with a range based on the silver, gold, or other metallic luster. In such case, the oxide, sulfide, or selenide may increase durability of the applied ink. That is, the absence of the oxide, sulfide, or selenide does not so much affect the metallic luster as it does the mechanical properties of the applied ink. The metallic luster may be unchanged in the absence of the oxide, sulfide, or selenide relative to its presence in small amounts, such as less than 2 wt % of the ink.

In one case, the oxide, sulfide, or selenide is provided in an amount sufficient to function in combination with other components as a primary colorant. In another case, the oxide, sulfide, or selenide is provided in an amount sufficient to function in combination with zero-valent metal particles to increase ink durability. Without being limited to any particular theory as to increased durability, it is possible that the oxide, sulfide, or selenide functions as a sort-of catalyst. Alternatively, or in addition, the oxide, sulfide, or selenide might coat metal particles to prevent oxidation.

Observation indicates that the selection of media may enhance metallic luster of the applied ink composition. For example, the solid substrate may include paper with a glossy finish. Other similarly coated media may also be appropriate.

According to a further embodiment, a method of use includes obtaining an inkjet ink composition containing an aqueous dispersion of particles of a first material and separate particles of a second material. The first material contains an oxide, sulfide, or selenide of iron and the second material contains either a conductive polymer or a zero valent metal. The method includes placing the ink in a reservoir of an inkjet printer cartridge configured to apply the ink to a solid substrate. The ink is formulated to produce an applied ink exhibiting a degree of metallic luster enhanced by the presence of the second material.

The Examples below describe various additional embodiments.

Example 1

A stable dispersion of magnetite (iron (II, III) oxide) nanoparticles was prepared by coprecipitation from a solution of Fe(II) and Fe(III) salts in basic solution, such as ammonium hydroxide, in the presence of a water-soluble vinyl polymer dispersant, such as poly(vinyl sulfonate), which may be poly (vinyl pyrrolidone) instead. An alkali metal hydroxide, for example, LiOH, NaOH, or KOH could be used instead to form the basic solution. A suitable surfactant could be used as an alternative to the polymer, for example, sodium dodecylsulfonate (SDS), sodium dodecylbenzensulfonate (SDBS), oleic acid, tetramethyl ammonium hydroxide, citric acid, soy lecithin, or a combination thereof. The polymer was added as a stabilizer at the time of preparation to stabilize the nanoparticles and prevent aggregation. The synthesis can be represented by the following equation:

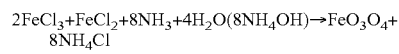

$$2FeCl_3 + FeCl_2 + 8NH_3 + 4H_2O(8NH_4OH) \rightarrow FeO_3O_4 + 8NH_4Cl$$

The resulting solids were isolated by centrifugation and kept as a wet paste. The paste readily redisperses in water. Particle size of the magnetite was measured in a NICOMP 380 submicron particle sizer available from Particle Sizing Systems (now Agilent Technologies, Inc. in Santa Clara, Calif.) and found to range from 10 nm to 200 nm, depending on the synthesis conditions. When using poly(vinyl sulfonate) as the polymer dispersant, the mean of the particle size dispersion was between 120 and 140 nm.

The other oxides of iron may be synthesized by altering the reaction conditions in a known manner.

Example 2

Ink A in Table 1 was made using the iron (II,III) oxide wet paste of Example 1 to form a dispersion containing 20 wt % iron (II,III) oxide. Iron (II,III) oxide content may range from 20 to 50 wt % merely by varying the amount of water used to redisperse the paste. Vehicle components were combined in water. The vehicle was formulated to be jettable from a thermal print-head. Ionic or non-ionic surfactants may be used. An amount of the dispersion sufficient to yield 1 wt % iron (II,III) oxide, as the colorant, was slowly let-down unto the vehicle under strong agitation. The iron (II,III) oxide dispersion comprised 5 wt % of the resulting solution, which was placed in a roller for 2 to 4 hours for homogenization and thereafter filtered to produce Ink A.

Example 3

Ink B in Table 1 was made using the iron (II,III) oxide wet paste of Example 1 to form a dispersion. A polypyrrole dispersion containing 20 wt % polypyrrole was prepared separately using a standard method known in the literature but modified by changing the reagents to include the poly(vinyl sulfonate) dispersant (or other dispersant of choice listed above). (Takashi Denpouya, Seigou Kawaguchi, and Katsutoshi Nagai, *Preparation of Aqueous Polypyrrole Dispersion by Oxidative Polymerization in the Presence of Surfactants,* 55 Polymer Preprints, Japan 1155 (2006); Shuangxi Xing and Guoku Zhao, 57 Polymer Bulletin 933-943 (2006); S. P. Armes and B. J. Vincent., 1987 Chem. Commun. 288 (1987); S. P. Armes and C. DeArmitt, *Colloidal Dispersions of Surfactant-Stabilized Polypyrrole Particles,* 9 Langmuir 652-654 (1993).)

Both dispersions were used as the primary colorants in an amount of each dispersion sufficient to yield 1 wt % iron (II,III) oxide and 1 wt % polypyrrole. The vehicle components were combined in the water and stirred for 10 minutes or until totally mixed to the naked eye. The polypyrrole dispersion was slowly dripped into the mixed vehicle solution over a period of 30 minutes to one hour. The pH was adjusted, if warranted, to about 7.0 to avoid precipitating the polymer at acidic pH. To the resulting polypyrrole-containing composition, the iron (II,III) oxide dispersion was slowly added under vigorous stirring over a period of an hour. The iron (II,III) oxide dispersion and the polypyrrole dispersion each comprised 5 wt % of the resulting solution, which was filtered to produce Ink B.

Example 4

Inks E, F, I, and J in Table 1 were made using iron (II,III) oxide wet paste prepared as in Example 1, except that dye(s) as secondary colorants were included in the solution of Fe(II) and Fe(III) salts prior to coprecipitation of the nanoparticles. The wet paste was used to form a dispersion containing 20 wt % iron (II,III) oxide. The dye amounts shown reflect wt % of the dye and its liquid carrier, not wt % of the dye molecule(s) itself. Inks E, F, and I were otherwise prepared as described in Example 3, except with varying ratios of polypyrrole to iron oxide. Ink J was otherwise prepared as described in Example 2 with no polypyrrole.

Example 5

Ink K in Table 1 was made using the polypyrrole dispersion of Example 3 as the primary colorant (without iron oxide) and mixed with a vehicle containing the other components, including the dye. The polypyrrole dispersion comprised 5 wt % of the resulting solution to provide 1 wt % polypyrrole.

Example 6

Printing Ink A on various coated, glossy media produced bronze to pinkish gold color with some metallic luster. Printing Ink J produced similar results with some yellow undertone. Printing Ink B produced yellowish gold color with brilliant metallic luster. Printing Ink K produced silver or PANTONE aluminum color with some metallic luster. The blue dye in Ink K increased the color vibrancy with some bluish undertone to the metallic luster. Printing Inks E, F, and I produced brilliant metallic luster with a range of colors depending on the weight ratio of polypyrrole loading to iron oxide loading, as described above, and undertone provided by the dye(s). The inks including iron oxide/polypyrrole colorants demonstrated good storage stability, excellent print quality, durability, and smudge resistance. The listed inks used less expensive components compared to pearlescent and silver and gold metal inks. They were also expected to meet regulatory standards for toxicity.

Example 7

Inks C, D, G, H, and L in Table 1 were made using a known Ag dispersion containing 20 wt % silver (SW102 available from Sumitomo Electric Company, Osaka, Japan) and vehicle components, including various dyes as secondary colorants. Particle size for the dispersion of Ag colloids was 50 to 60 nm and it was stable for 6 weeks at 60° C. The Ag dispersion/vehicle compositions and Ink L without iron oxide suffered durability and other permanence issues after printing.

The iron (II,III) oxide wet paste of Example 1 was used to form a dispersion containing 20 wt % iron oxide. The addition of the iron oxide dispersion to the compositions provided inks exhibiting greatly increased durability, including increased smudgefastness and smearfastness, using standard quantification techniques. Observation indicated that 0.1 to 1 wt % iron oxide stopped smudging and abrasive smear as well as oxidative fading. The addition of iron oxide at these amounts did not affect stability of the Ag dispersion.

TABLE 1

| All values shown are weight percent. | | | | | | | |
|---|---|---|---|---|---|---|---|
| Component | Function | Ink A | Ink B | Ink C | Ink D | Ink E | Ink F |
| iron oxide | colorant | 1 | 1 | 0.4 | 1 | 0.5 | 1 |
| polypyrrole | colorant | | 1 | | | 1 | 0.5 |
| silver | colorant | | | 2 | 2 | | |
| direct blue-199-Na | dye | | | | | 3 | |
| acid blue-9-Na | dye | | | | 3 | | 3 |
| acid yellow-23-Na | dye | | | 3 | | | |
| direct yellow-132-Na | dye | | | | 3 | | |
| acid red-52-Na | dye | | | | | 3 | |
| vehicle | various | 27.2 | 26.2 | 28.3 | 20.7 | 23 | 20.95 |
| water | solvent | 71.8 | 71.8 | 69.3 | 70.3 | 69.5 | 74.55 |
| Total | | 100 | 100 | 100 | 100 | 100 | 100 |
| Component | Function | Ink G | Ink H | Ink I | Ink J | Ink K | Ink L |
| iron oxide | colorant | 0.2 | 0.4 | 1 | 1 | | |
| polypyrrole | colorant | | | 0.4 | | 1 | |
| silver | colorant | 2 | 2 | | | | 2 |

TABLE 1-continued

| All values shown are weight percent. | | | | | | | |
|---|---|---|---|---|---|---|---|
| direct blue-199-Na | dye | 3 | | | | 2 | |
| acid blue-9-Na | dye | | 3 | 3 | | 2 | |
| acid yellow-23-Na | dye | | | | | | |
| direct yellow-132-Na | dye | 3 | | | 3 | | |
| acid red-52-Na | dye | | | | | | 3 |
| vehicle | various | 20.0 | 18.3 | 23.1 | 24.0 | 30.2 | 25.2 |
| water | solvent | 72.8 | 76.3 | 72.5 | 72.0 | 64.8 | 69.8 |
| Total | | 100 | 100 | 100 | 100 | 100 | 100 |

Example 8

Zero-valent silver Inks C, D, G, and H of Example 6 were filled into ink jet cartridges and printed on media using a HP Deskjet 6540. A HP Deskjet 5550 may be used instead and various cartridges may be suitable.

The inks worked on various glossy media to varying degrees. For example, some print samples exhibited a brown to tan color that lacked any metallic luster. Cotton fiber paper, copy paper, recycled fiber paper all gave poor results with a brown to tan non-metallic luster. Addition of the organic dyes in Table 1 allowed production of blue, yellow, green, or red silver complexes to enhance the color gamut of silver. After testing a number of photographic media, the media listed in Table 2 yielded images with metallic luster that were acceptable. The images were water fast on double or single sided media.

TABLE 2

| Media | Sides | Corporate Location |
|---|---|---|
| Tetanal Photo Glossy | single | Germany |
| Tetanal Fine Art Glossy | single | Germany |
| Folex Fotojet Professional Inkjet Photo | single | Switzerland |
| Taiho Industries APL-1 (GTC) | single | Japan |
| Moab Kokopelli 260 Glossy | single | USA |
| Hewlett Packard Solar Rev 3A | | USA |
| Pictorico Premium Photo | double | USA |
| Mitsubishi IF-RC2-VM (GTA) | double | Japan |
| Lakeland Pearl | double | UK |
| Sihl Diatec 4803 | double | Germany |

The invention claimed is:

1. An ink composition comprising an aqueous dispersion of particles of a first material and separate particles of a second material, the first material containing an oxide, sulfide, or selenide of a magnetic metal and the ink being formulated to exhibit, after application to a solid substrate, a degree of metallic luster enhanced by the presence of the second material;
   wherein the oxide, sulfide, or selenide comprises wustite, magnetite, hematite, maghemite, or a combination thereof;
   wherein the particles of the first material exhibit an average particle size less than 200 nm and the particles of the second material exhibit an average particle size less than 200 nm; and
   wherein the second material comprises zero-valent Ti, Mn, Mo, Pd, Ag, Sn, Ta, Pt, Au, or a combination thereof.

2. The ink composition of claim 1 wherein the ink is also formulated to function as an inkjet ink composition.

3. The ink composition of claim 1 wherein the oxide, sulfide, or selenide comprises an iron oxide.

4. The ink composition of claim 1 wherein the ink is formulated such that the oxide, sulfide, or selenide functions as a primary colorant of the ink.

5. The ink composition of claim 1 wherein the second material comprises a conjugated, conductive polymer and the ink is formulated such that the degree of metallic luster is also enhanced by the presence of the oxide, sulfide, or selenide.

6. The ink composition of claim 1 wherein the second material comprises a zero valent metal and the ink is formulated such that the degree of metallic luster is exhibited even in the absence of the oxide, sulfide, or selenide.

7. The ink composition of claim 1 wherein the oxide, sulfide, or selenide increases durability of the applied ink.

8. The ink composition of claim 1 wherein the solid substrate exhibits a glossy finish.

9. An inkjet ink composition comprising an aqueous dispersion of particles of a first material and separate particles of a second material, the first material containing an oxide, sulfide, or selenide of Mn, Fe, Co, Ni, Gd, or a combination thereof, the second material containing a conjugated, conductive polymer, the particles of the first material exhibiting an average particle size less than 200 nm, and the ink being formulated to function as an inkjet ink composition;
   wherein the conductive polymer comprises polypyrrole, polythiophene, polyaniline, polyfuran, copolymers of at least two of pyrrole, thiophene, aniline, and furan, or a combination thereof; and
   wherein the oxide, sulfide, or selenide comprises wustite, magnetite, hematite, maghemite, or a combination thereof.

10. The ink composition of claim 9 wherein the ink is formulated such that the oxide, sulfide, or selenide functions as a primary colorant of the ink.

11. A method comprising:
   obtaining an inkjet ink composition containing an aqueous dispersion of particles of a first material and separate particles of a second material, the first material containing an oxide, sulfide, or selenide of iron and the second material containing either a conductive polymer or a zero valent metal;
   placing the ink in a reservoir of an inkjet printer cartridge configured to apply the ink to a solid substrate, the ink being formulated to produce an applied ink exhibiting a degree of metallic luster enhanced by the presence of the second material;
   wherein the oxide, sulfide, or selenide comprises wustite, magnetite, hematite, maghemite, or a combination thereof;
   wherein the particles of the first material exhibit an average particle size less than 200 nm and the particles of the second material exhibit an average particle size less than 200 nm;

wherein the conductive polymer comprises polypyrrole, polythiophene, polyaniline, polyfuran, copolymers of at least two of pyrrole, thiophene, aniline, and furan, or a combination thereof; and wherein the zero-valent metal comprises Ti, Mn, Mo, Pd, Ag, Sn, Ta, Pt, Au, or a combination thereof.

12. The method of claim 11 wherein the applied ink is magnetic.

13. The method of claim 11 wherein the ink is formulated such that the oxide, sulfide, or selenide functions as a primary colorant of the ink.

14. The method of claim 11 wherein the second material comprises a conjugated, conductive polymer and the ink is formulated such that the degree of metallic luster is also enhanced by the presence of the oxide, sulfide, or selenide.

* * * * *